United States Patent Office 2,921,940
Patented Jan. 19, 1960

2,921,940

GRIGNARD PREPARATION OF CERTAIN HYDROXY COMPOUNDS

Hugh E. Ramsden, Metuchen, N.J., assignor to Metal & Thermit Corporation, New York, N.Y., a corporation of New Jersey No Drawing. Application November 28, 1955
Serial No. 549,542

7 Claims. (Cl. 260—297)

This invention relates to a process of reacting organomagnesium chloride reagents with saturated and unsaturated aldehydes and ketones and to products made by this process. This application is a continuation-in-part of application Serial Number 520,140, filed July 5, 1955, now abandoned.

The organomagnesium chloride reagents employed in practicing this invention may be described as $$RMgCl \cdot nQ$$

where R is an aryl group, a vinyl group or a heterocyclic group, as more particularly defined below, $n$ is an indeterminate number from 1 to 3 and Q has a value hereinafter defined. These organomagnesium chloride reagents are made by reacting the corresponding RCl with magnesium in the presence of compound Q as reaction medium. In accordance with this invention, these organomagnesium chloride reagents react with aldehydes or ketones to yield, after further reaction with water or dilute acid, substituted alcohols. These alcohols are useful as intermediates (for the manufacture of plasticizers), as insecticides, as perfumes and other products.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran 2-methyltetrahydrofuran, 2-ethoxytetrahydropyran, tetrahydrofurfuryl ethyl ether, dihydropyran, dibenzofuran and N-methylmorpholine. Permissible substitutions being groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i.e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e.g., above 90° C.) causes great difficulty in carrying out the reaction. Any liquid Q of any structure whatsoever (with the limitations specified hereinbefore) will work.

The reactions may be carried out in a compound Q as reaction medium, preferably at a temperature between room temperature and the reflux temperature. However, the temperature is not critical and may be even lower than room temperature. Inert hydrocarbon solvents may also be used as the reaction medium in place of compound Q.

The compound Q, employed to promote reaction and to form a complex with the vinyl, heterocyclic or aryl magnesium chloride may be a simple 5 or 6 member heterocyclic compound containing one oxygen in the ring and having the requisite characteristics set forth above, e.g., tetrahydrofuran, tetrahydropyran, dihydropyran, etc. It may also be a 5 or 6 member heterocyclic compound containing one oxygen in the ring and further substituted by monovalent groups and having said characteristics, e.g., 2-methyltetrahydrofuran, 2-ethoxytetrahydrofuran, tetrahydrofurfuryl ethyl ether, N-methyl morpholine, etc. Furthermore, the compound Q may be a 5 or 6 member heterocyclic compound having one oxygen atom in the ring and substituted by polyvalent radicals to form fused ring compounds, providing that the compound has the necessary characteristics set forth above in the definition of compound Q, e.g., dibenzofuran, etc. When the reaction between the aldehyde or ketone and the organomagnesium chloride reagent is finished, cold water and/or dilute acid is added carefully and the resulting substituted alcohol is recovered by distillation or otherwise. The sequence of reactions in the case of aldehydes is illustrated by the following general equations:

(1)   $RMgCl \cdot nQ + R'CHO \rightarrow RR'CHOMgCl + nQ$ (2)   $RR'CHOMgCl + H_2O \rightarrow RR'CHOH + MgClOH$ For ketones, the general reactions may be written:

(1A)  $RMgCl \cdot nQ + R'R''C=O$
$\rightarrow RR'R''COMgCl + nQ$ (2A)  $RR'R''OMgCl + H_2O$
$\rightarrow RR'R''COH \pm MgClOH$ R, R' and R'' are organic radicals which will be more specifically defined hereinafter:

ARYLMAGNESIUM CHLORIDE REAGENTS (A) *Reactions with aldehydes.*—The reactions of arylmagnesium chloride reagents with aldehydes in accordance with this invention may be illustrated by the following over-all equations, which include the hydrolysis step (Equation 2 above). It is to be understood that Reactions 1 and 2 must be carried out separately. The overall equations below are summations of these separate reactions.

(3)   $RMgCl \cdot nQ + R'CHO + H_2O$
$\rightarrow RR'CHOH + MgClOH + nQ$ (4)   $R''(MgCl)_x \cdot nQ + xR'CHO$
$+ xH_2O \rightarrow R''(R'CHOH)_x$
$+ xMgClOH + nQ$ or, more specifically (5)   $RMgCl \cdot nQ + CH_2O + H_2O$
$\rightarrow RCH_2OH + MgClOH + nQ$ (6)   $RMgCl \cdot nQ + CH_3CHO + H_2O \longrightarrow \begin{matrix} CH_3 \\ \diagdown \\ CHOH + nQ \\ \diagup \\ R \end{matrix}$ (7) $\text{RMgCl}.n\text{Q} +$ 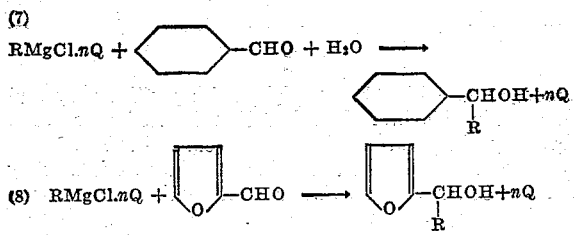

(8) $\text{RMgCl}.n\text{Q} +$ 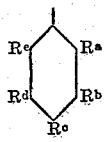 (furfural reaction, yielding furfuryl alcohol derivative + $n\text{Q}$)

wherein $n$ and $x$ are small whole numbers, R' may be alkyl, aryl, alkenyl, aralkyl, heterocyclic and hydrogen, R'' is an aromatic polyradical of valence $x$ whose hydrogens may be replaced by fluorine, chlorine, alkyl, alkenyl, aryl, aralkyl, heterocyclic, alkoxy, aryloxy and dialkylamino groups, and wherein R is defined as:

(benzene ring with substituents $R^a, R^b, R^c, R^d, R^e$)

wherein $R^a$, $R^b$, $R^c$, $R^d$ and $R^e$ may be the same or different substituents as long as they do not react with the arylmagnesium chloride reagent. They may be hydrogen; fluorine, chlorine; alkyl, such as methyl, ethyl, etc.; alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxyl, such as methoxy, ethoxy, allyloxy, etc.; aryloxy, such as phenoxy, tolyloxy, xenyloxy, etc.; and dialkylamino, such as dimethylamino, diethylamino, etc. groups.

Chlorophenyl and substituted chlorophenyl magnesium chlorides react with aldehydes, as illustrated by the following over-all equations which summarize the result of separate reactions (Equations 1 and 2).

(9) $\text{RMgCl}.n\text{Q} + \text{CH}_2\text{O} \pm \text{H}_2\text{O} \rightarrow \text{RCH}_2\text{OH} + \text{MgClOH} + n\text{Q}$

(10) $\text{RMgCl}.n\text{Q} + \text{CH}_3\text{CHO} + \text{H}_2\text{O} \rightarrow \text{CH}_3\text{CHOH(R)} + \text{MgClOH} + n\text{Q}$

(11) $\text{RMgCl}.n\text{Q} + \text{R'CH}_2\text{CHO} + \text{H}_2\text{O} \rightarrow \text{R'CH}_2\text{CHOH(R)} + \text{MgClOH} \pm n\text{Q}$

(12) $\text{RMgCl}.n\text{Q} + \text{R'R''CHCHO} + \text{H}_2\text{O} \rightarrow \text{R'R''CHCHOH(R)} + \text{MgClOH} + n\text{Q}$

(13) $\text{RMgCl}.n\text{Q} + \text{R'R''R'''C—CHO} + \text{H}_2\text{O} \rightarrow \text{R'R''R'''CCHOH(R)} + \text{MgClOH} + n\text{Q}$

(14) $\text{RMgCl}.n\text{Q} +$ 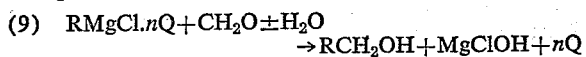 $+ \text{H}_2\text{O} \rightarrow$
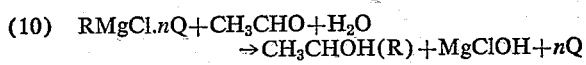 $+ \text{MgClOH} + n\text{Q}$

(15) $\text{RMgCl}.n\text{Q} +$  $+ \text{H}_2\text{O} \rightarrow$
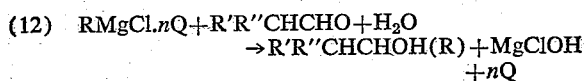 $+ \text{MgClOH} + n\text{Q}$ wherein R', R'' and R''' may be the same or different and may be alkyl, aryl, alkenyl, aralkyl, heterocyclic and hydrogen and wherein R, in the case of the chlorophenyl and substituted chlorophenylmagnesium chlorides, is defined as:

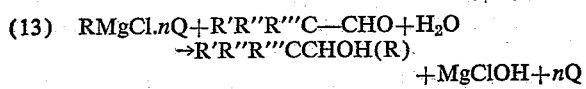
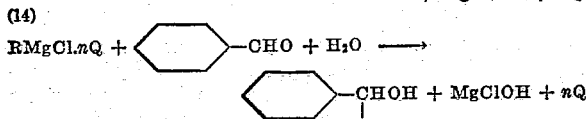
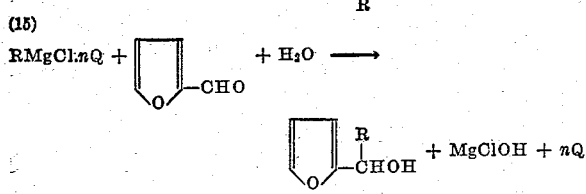
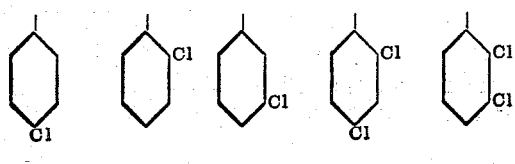

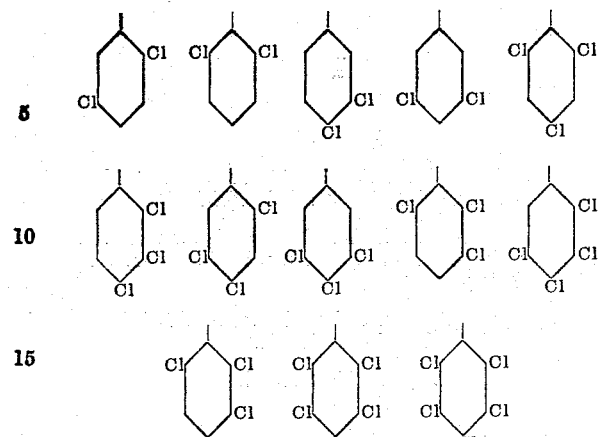

In the above radicals any positions not containing chlorine may be filled with fluorine or any organic monovalent group such as alkyl, alkenyl, aryl, dialkylamino, alkoxy, aryloxy and alkenyloxy groups. In addition, divalent groups such as alkylidene dioxy groups may join to adjacent open positions. The substituents may contain functional groups if these are not reactive to the aryl magnesium chloride reagent.

Xenylmagnesium chlorides react similarly with aldehydes. The reactions are illustrated by the following unbalanced equations which imply that the hydrolysis step (Equation 2) has been carried out:

(16) $\text{RMgCl}.n\text{Q} + \text{CH}_2\text{O} \rightarrow \text{RCH}_2\text{OH}$

(17) $\text{RMgCl}.n\text{Q} + \text{CH}_3\text{CHO} \longrightarrow \text{CH}_3\text{CHOH(R)} \xrightarrow{-\text{H}_2\text{O}} \text{CH}_2=\text{CHR}$

(18) $\text{RMgCl}.n\text{Q} + \text{R'CH}_2\text{CHO} \longrightarrow \text{R'CH}_2\text{CHOH(R)} \xrightarrow{-\text{H}_2\text{O}} \text{R'CH}=\text{CHR}$

(19) $\text{RMgCl}.n\text{Q} + \text{R'R''CHCHO} \longrightarrow \text{R'R''CHCHOH(R)} \xrightarrow{-\text{H}_2\text{O}} \text{R'R''C}=\text{CHR}$

(20) $\text{RMgCl}.n\text{Q} + \text{R'R''R'''CCHO} \longrightarrow \text{R'R''R'''CCHOH(R)}$

(21) $\text{RMgCl}.n\text{Q} \pm$ 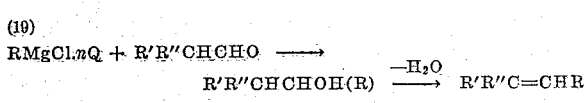

(22) $\text{RMgCl}.n\text{Q} +$ 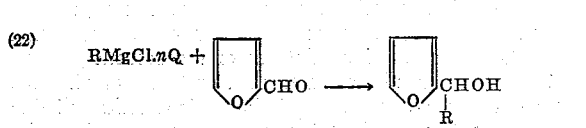

wherein R', R'' and R''' is defined in the above reactions as being the same or different and may be alkyl, aryl, alkenyl, aralkyl, heterocyclic or hydrogen and R is defined in the above reactions as a xenyl radical, substituted or unsubstituted. The raw materials for preparing the RMgCl by the polymethylene oxide process might also contain some chlorinated terphenyl. Thus R may be:

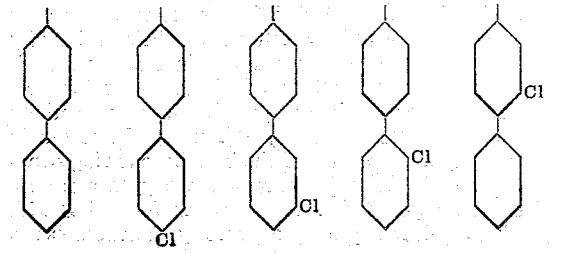

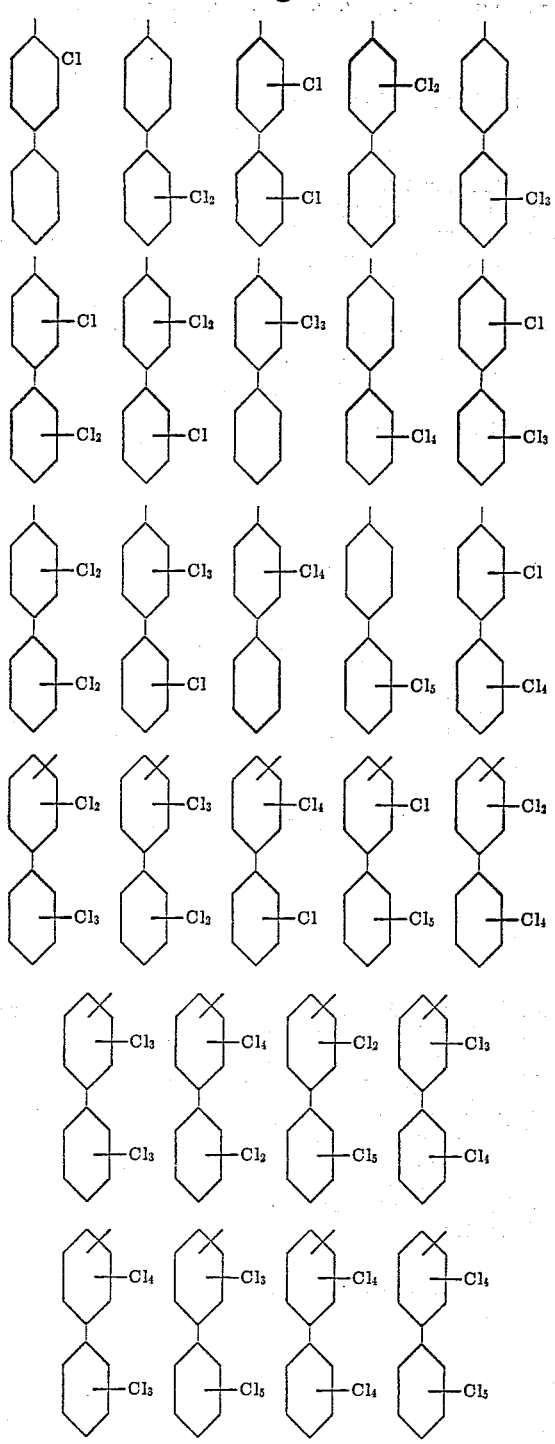

The bond to the magnesium may be ortho, meta or para to the second ring. Other groups may be present instead of ring hydrogen, including alkyl, alkenyl, aryl, alkaryl, aralkyl, fluorine, alkoxy, alkenoxy, aryloxy, dialkylamino, etc. groups.

These alcohols, resulting from the above aryl magnesium chloride reactions (including chlorophenylmagnesium chloride and xenylmagnesium chloride reactions), which have RCOH—CH= groups present, may be dehydrated to yield styrene type compounds.

Thus,

(23) $\quad RCHOHCH_3 \rightarrow RCH=CH_2$

Bifunctional arylene di(magnesium chloride) reagents may also be used with aldehydes, according to the following over-all reactions which include the separate hydrolysis steps:

(24) $R(MgCl)_2 \cdot nQ + CH_2O + 2H_2O$
$\rightarrow R(CH_2OH)_2 + 2MgClOH + nQ$

(25) $R(MgCl)_2 \cdot nQ + CH_3CHO + 2H_2O$
$\rightarrow R(CH_3CHOH)_2 \rightarrow R(CH_2=CH)_2 + 2MgClOH + nQ$ The following unbalanced equations illustrate the reactions more graphically; it is assumed that the hydrolysis step has been carried out:

(26)
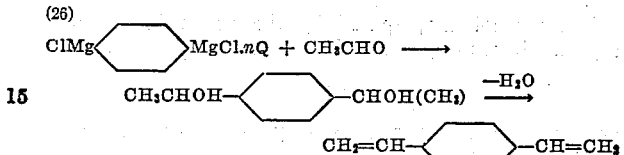

(27) $R(MgCl)_2 \cdot nQ + R'CHO \rightarrow R(CHOHR')_2$

(28)
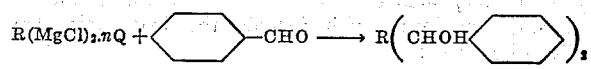

(29)
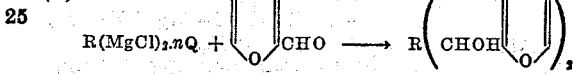

(30)
$R(MgCl)_2 \cdot nQ + R'R''CHCHO \longrightarrow$
$R(CHOH-CHR'R'')_2 \xrightarrow{-H_2O} R(-CH=CR'R'')_2$ wherein $R(MgCl)_2$ may be in general:

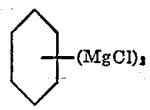

wherein the hydrogens on the ring may be replaced by any group not reactive to RMgCl, such as chlorine, fluorine, $R'_2N$—, $R'O$—, $R'$ etc., and wherein $R'$ is a monovalent organic radical. Two neighboring $R'$ radicals may be cyclicized. $R(MgCl)_2$ may also be:

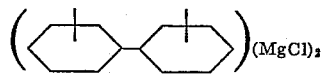

where hydrogen may be replaced as above;

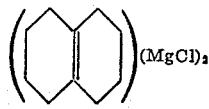

where hydrogen may be replaced as above;

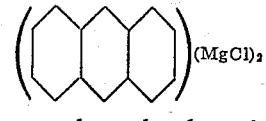

where hydrogen may be replaced as above;

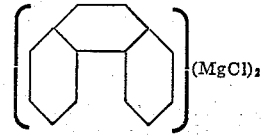

where hydrogen may be replaced as above;

or R may be any other bivalent group where the bonds from carbon to magnesium are those of aromatic carbon to magnesium.

Furthermore, the number of —MgCl groups attached to R may be more than two. Thus, we may have reactions analogous to those described above involving the tri-, tetra-, penta- and hexa- or even higher magnesium chloride derivatives of aryl compounds including such derivatives of chlorinated biphenyls, terphenyls, naphthalenes, etc. For example, such a reagent may be prepared by the following reaction

(31) 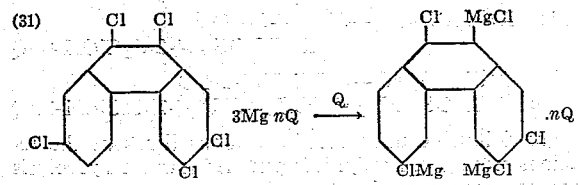

Those alcohols prepared by the above bifunctional arylene di(magnesium chloride) process which have

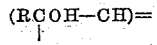
(RCOH—CH)= groups present, may also be dehydrated to yield olefins according to Reaction 23.

(B) *Reactions with ketones.*—The arylmagnesium chloride reagents of this invention react with ketones to yield tertiary alcohols as illustrated by the following over-all equations which include the hydrolysis step (Equations 2A):

(32) $RMgCl \cdot nQ + R'R''C=O + H_2O$
$\rightarrow RR'R''COH + MgClOH + nQ$

(33) $RMgCl \cdot nQ + CH_3 \cdot C_2H_5C=O + H_2O$
$\rightarrow R \cdot CH_3 \cdot C_2H_5COH + MgClOH + nQ$

(34) $RMgCl \cdot nQ + (CH_3)_2C=O + H_2O$
$\rightarrow (CH_3)_2C(OH)R + MgClOH + nQ$

(35) $RMgCl \cdot nQ + R'(CH_3)C=O + H_2O$
$\rightarrow R'(CH_3)C(OH)R + MgClOH + nQ$

(36) 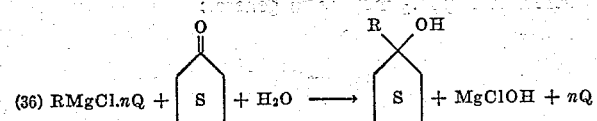

(37) 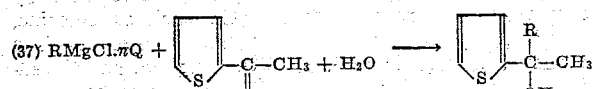

(38) 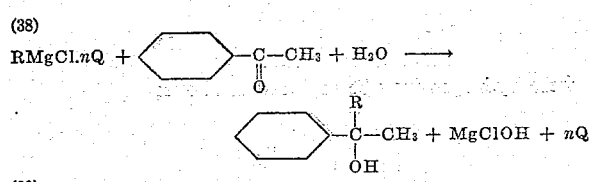

(39) 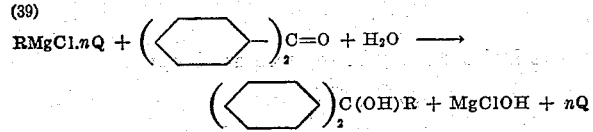

(40) 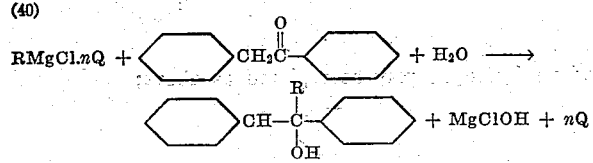

wherein R is defined in Reactions 3–8, and R' and R'' may be alkyl, aryl, alkenyl, aralkyl, heterocyclic and hydrogen. As used herein the symbol

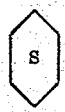

designates a saturated ring.

Chlorophenyl and substituted chlorophenylmagnesium chlorides react with ketones to yield alcohol reaction products according to Reactions 34–40, wherein R is as defined for Reactions 9–15.

In addition, these alcohols containing the group:

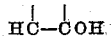

may be dehydrated to

as in Reaction 23.

Xenylmagnesium chlorides also react with ketones to yield tertiary alcohols. Alcohols made by this process which contain the structure

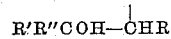
R'R''COH—CHR can be dehydrated to form olefins, as follows:

(41) $RMgCl \cdot nQ + (CH_3)_2C=O$
$\rightarrow R(CH_3)_2C(OH)CH_3 \rightarrow R(CH_3)C=CH_2$

(42) $RMgCl \cdot nQ + R'(CH_3)C=O$
$\rightarrow R'(CH_3)C(OH)R \rightarrow$ dehydrated products

(43) 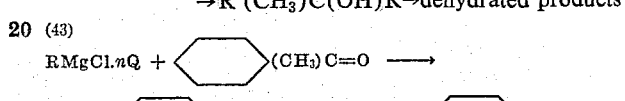

(44) 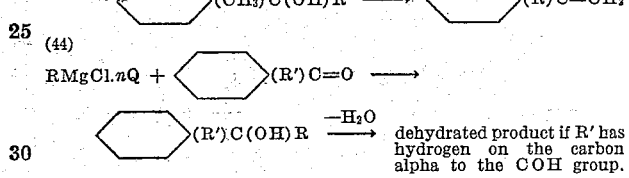

(45) 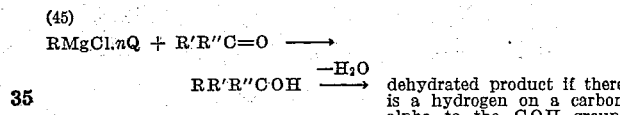

(46) 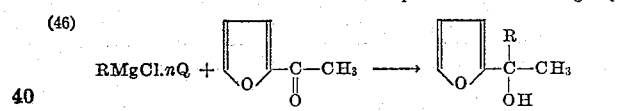

wherein R is as defined for Reactions 16–22, and wherein R', R'' and R''' may be alkyl, aryl, alkenyl, aralkyl and hydrogen.

Bifunctional arylene di(magnesium chloride) reagents react with ketones to form tertiary alcohols and these may be dehydrated to yield various dehydration products provided they contain hydrogen on a carbon atom alpha to the COH group. The following unbalanced equations are illustrative; it is assumed that the hydrolysis step has been carried out:

(47) 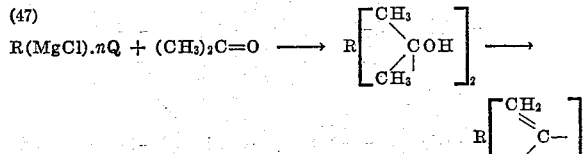

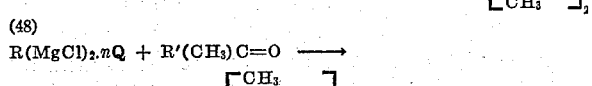

(48) 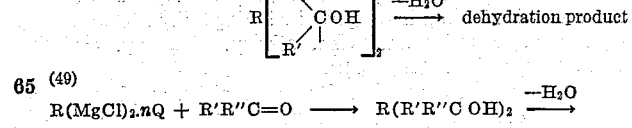

(49) 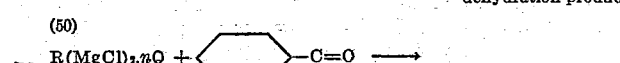

(50) 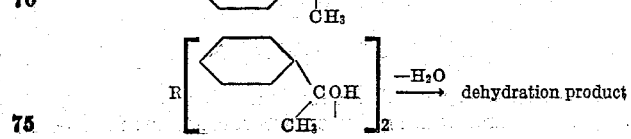

(51) 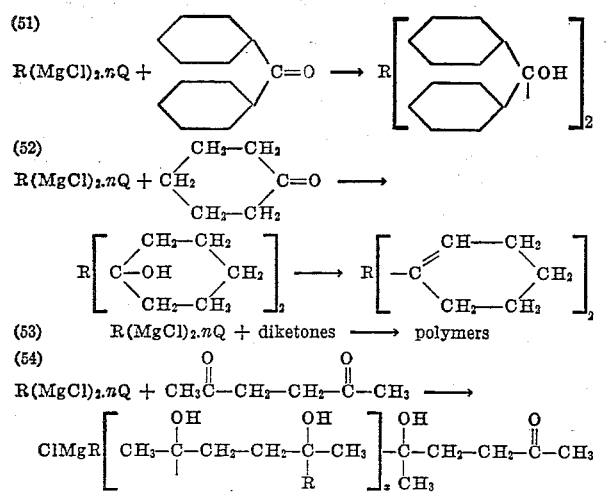

(52)

(53) R(MgCl)$_2 \cdot n$Q + diketones → polymers

(54) 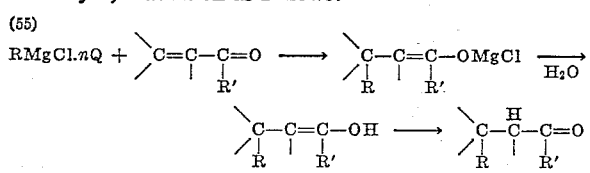

wherein R(MgCl)$_2$ is defined as for Reactions 24 to 30, and R' and R'' are defined as hydrocarbon groups.

(C) *Reactions with alpha, beta unsaturated aldehydes and ketones.*—The arylmagnesium chloride complexes of this invention may react with alpha, beta unsaturated aldehydes and ketones, i.e., compounds containing the group $$\diagdown_{\diagup}\!C\!=\!C\!-\!\underset{R'}{\overset{}{C}}\!=\!O$$

where R' is hydrogen or a hydrocarbon group, by addition to the carbonyl group, just as in the numerous reactions described under parts A and B. They may also react by 1, 4 addition as follows:

(55)
$$RMgCl \cdot nQ + \diagdown_{\diagup}\!C\!=\!C\!-\!\underset{R'}{\overset{}{C}}\!=\!O \longrightarrow \diagdown_{\diagup}\!\underset{R}{\overset{}{C}}\!-\!C\!=\!C\!-\!\underset{R'}{\overset{}{C}}\!-\!OMgCl \xrightarrow{H_2O}$$
$$\diagdown_{\diagup}\!\underset{R}{\overset{}{C}}\!-\!C\!=\!C\!-\!\underset{R'}{\overset{}{C}}\!-\!OH \longrightarrow \diagdown_{\diagup}\!\underset{R}{\overset{}{C}}\!-\!\underset{R'}{\overset{H}{C}}\!-\!C\!=\!O$$

where R and R' are as defined for Equations 3–8, and where the free bonds may be joined to hydrogen or any hydrocarbon group.

Chlorophenyl and substituted chlorophenylmagnesium chloride complexes, like the arylmagnesium chloride complexes in general, react with alpha, beta unsaturated carbonyl compounds either by addition to the carbonyl linkage or by 1–4 addition according to general Equation No. 55 above, in which R is now defined as for Reactions 9–15 and R' is as defined for Reactions 3–8.

Bifunctional arylene di(magnesium chloride) reagents react with alpha, beta unsaturated aldehydes and ketones by either 1, 2 or 1, 4 addition. The former type reaction is illustrated in the following equations which do not show the hydrolysis step but imply that it has been carried out.

(56) R(MgCl)$_2 \cdot n$Q + CH$_2$=CHCHO
→ R(CHOH—CH=CH$_2$)$_2 + n$Q

(57) R(MgCl)$_2 \cdot n$Q + CH$_2$=CHCOCH$_3$ → R($\overset{CH_3}{\underset{|}{C}}$OH—CH=CH$_2$)$_2 + n$Q wherein R is the same as for Reactions 24 through 30.

(D) *Reactions with chloral.*—Chloral also reacts with arylmagnesium chlorides to form derivatives some of which are useful as insecticides:

(58) RMgCl·$n$Q  CCl$_3$CHO → CCl$_3$CH(OH)R + $n$Q wherein RMgCl in this case may be: (*a*) dialkylaminophenylmagnesium chloride reagents, which are made according to the following reactions:

(59) 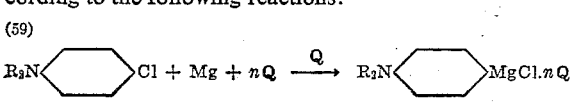

(60) 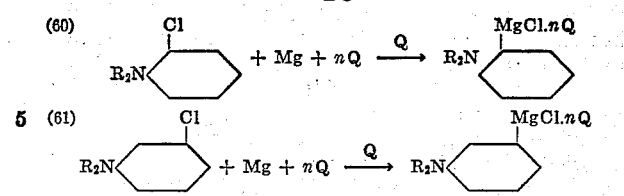

(61) 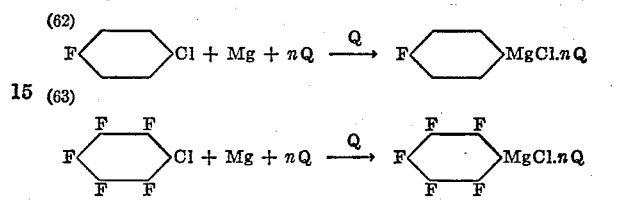

(*b*) Fluorine and polyfluorine substituted arylmagnesium chloride reagents which are made according to the following reactions:

(62)

(63)

(*c*) Hydrocarbosilylaryl magnesium chloride complexes, formed, as illustrated in Equations Nos. 64–68 below, by reaction of a hydrocarbosilylaryl chloride with magnesium in the presence of the compound Q, which has been previously defined:

(64)

(65)

(66)

(67)

(68)

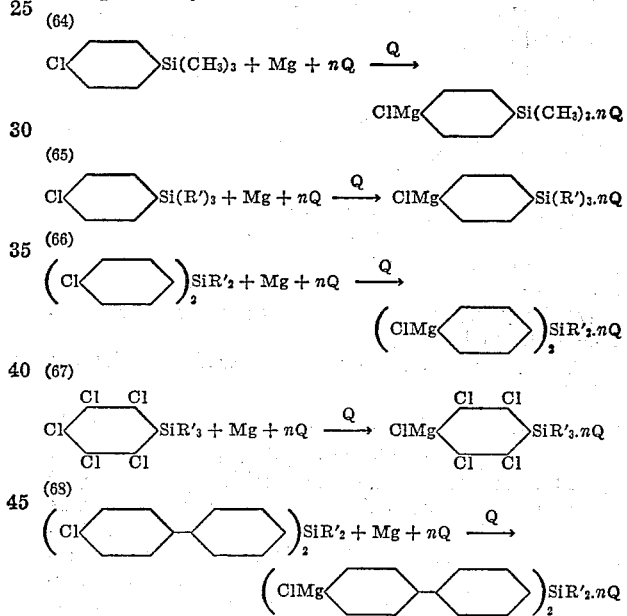

in which R' represents a hydrocarbon group and in which the benzene rings may contain any substituents not reactive to the RMgCl·$n$Q;

(*d*) Hydrocarbostannylarylmagnesium chloride complexes formed by reaction of a hydrocarbostannylaryl chloride with magnesium in the presence of Q in accordance with the following Reactions 69–71.

(69)

(70)

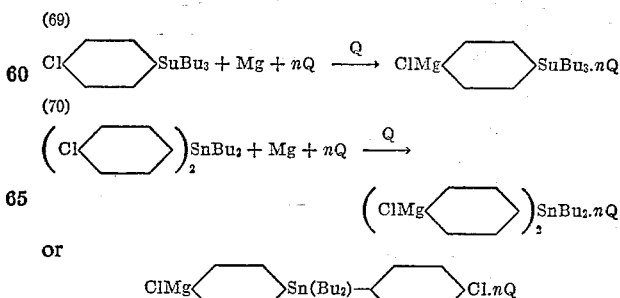

or

Generally:

(71) 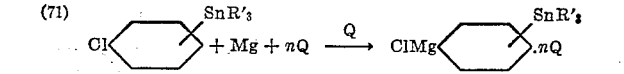

wherein Bu is the butyl group, R' is a hydrocarbon group,

Q has a value as previously defined, and wherein the benzene group may contain any substituents not reactive to $RMgCl \cdot nQ$;

(e) Arylmagnesium chloride complexes defined for Reactions 5-8; arylmagnesium chloride complexes, generally, formed from polynuclear condensed aromatic chlorides by reactions with magnesium in the presence of Q. Examples of suitable chlorides in this category are:

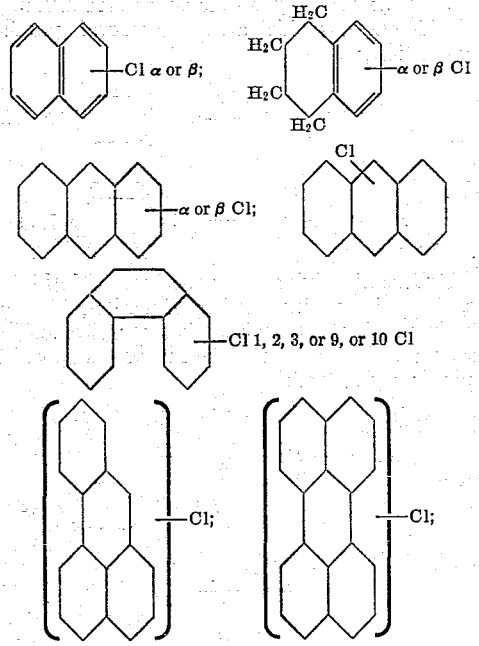

chlorophenyl and substituted chlorophenyl magnesium chlorides as defined in Reactions 9 through 15;

(f) Xenylmagnesium chlorides as defined for Reactions 16 through 22;

(g) Arylpolymagnesium chlorides react with chloral as follows:

(72) $R(MgCl)_x \cdot nQ + CCl_3CHO \rightarrow (CCl_3CHOH)_x R + nQ$ wherein $R(MgCl)_x \cdot nQ$ is the polymagnesium chloride reagent formed by the reaction, in Q as reaction medium, of magnesium with polychlorinated aromatic compounds such as di-, tri-, tetra-, penta- and hexachlorides of single-ring compounds as well as chlorinated polynuclear compounds, such as chlorinated biphenyls, terphenyls, naphthalenes, etc., which may contain even more chlorine. R, above, may also be defined as for Equation 3 and for Equations 24-30.

Typical equations for the formation of $R(MgCl)_x \cdot nQ$ are:

(73)

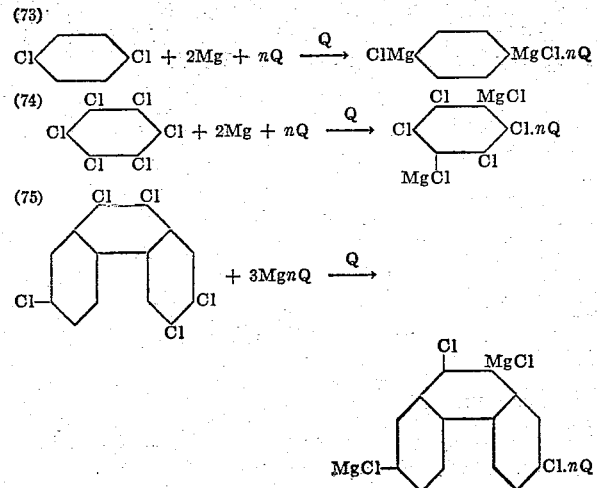

HETEROCYCLIC MAGNESIUM CHLORIDE REAGENTS (A) *Reactions with aldehydes.*—Heterocyclic magnesium chloride reagents, $RMgCl \cdot nQ$, as defined below, react with aldehydes to yield, after hydrolysis, secondary alcohols (primary alcohols are produced from formaldehyde). Typical reactions are shown by the following unbalanced equations:

(76)    $RMgCl \cdot nQ + CH_2O \rightarrow RCH_2OH + nQ$

(77)    $RMgCl \cdot nQ + R'CHO \rightarrow RR'CHOH + nQ$ wherein R' is an alkyl or aralkyl;

(78)    $RMgCl \cdot nQ + R''CHO \rightarrow RR''CHOH + nQ$ wherein R'' is an aryl radical

(79)
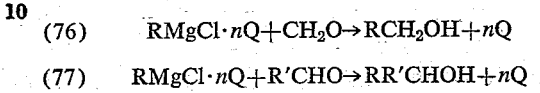

(80)

in which $n$ is a small whole number, Q has the value ascribed to it above, and R is a radical which includes in its structure an oxygen, sulfur or tertiary nitrogen heterocycle, its bond to magnesium being through a carbon of an aromatic or pseudo-aromatic ring.

Among the types of heterocyclic groups, R, which may be employed in reactions such as Nos. 76-80 are those shown in the following structural formulas in which a free bond indicates the point of attachment of the $-MgCl$ group except that when two free bonds are shown in one structure they represent alternative points of attachment. In these structures any or all hydrogens in the molecules may be replaced by fluorine, chlorine, alkyl, alkenyl, aryl, alkoxy, aryloxy or other groups not reactive to RMgCl. Two adjacent substituents may be linked or cyclized to form further condensed rings.

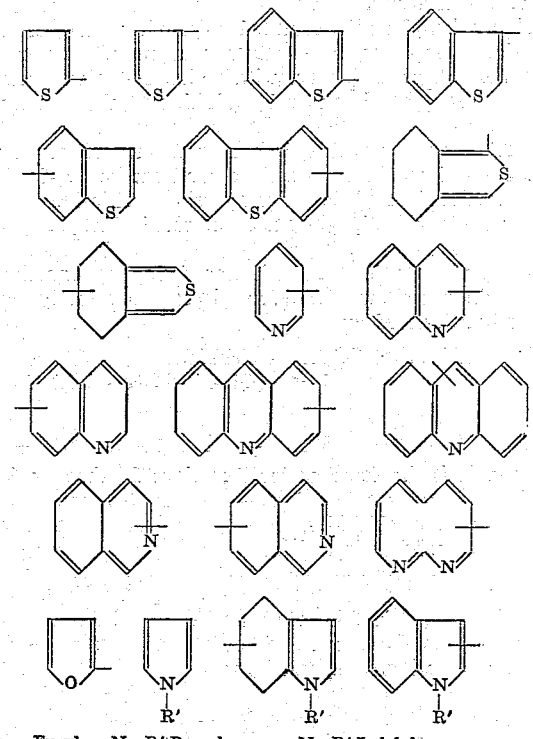

Furyl    N—R' Pyrryl    N—R' Indolyl

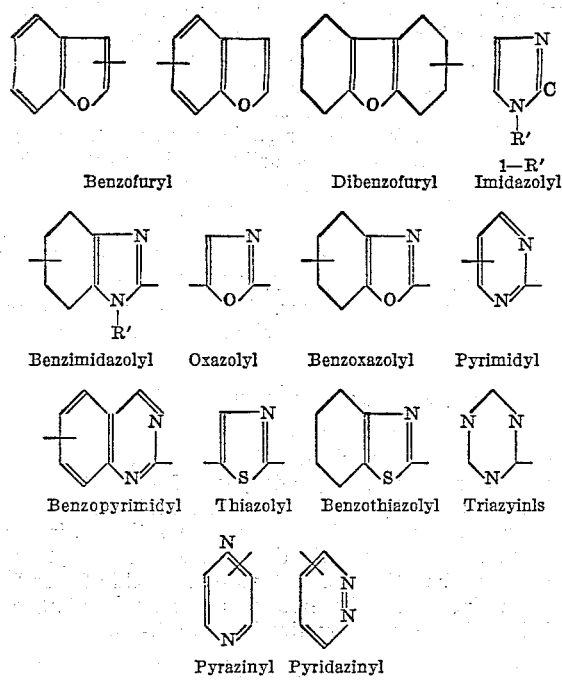

Benzofuryl    Dibenzofuryl    1—R' Imidazolyl

Benzimidazolyl   Oxazolyl   Benzoxazolyl   Pyrimidyl

Benzopyrimidyl   Thiazolyl   Benzothiazolyl   Triazyinls

Pyrazinyl   Pyridazinyl

Bifunctional, heterocyclic di(magnesium chlorides), R(MgCl)$_2$·nQ, react with aldehydes in accordance with Equations 24 through 30; in all of these reactions R is a divalent radical which includes in its cyclic structure an oxygen, sulfur or tertiary nitrogen heterocycle, its bonds to magnesium being through carbon atoms of aromatic or pseudo aromatic rings.

(B) *Reactions with ketones.*—Heterocyclic magnesium chloride reagents, RMgCl·nQ as defined for Reactions 76–80 react with ketones to form tertiary alcohols, some of which can be dehydrated to yield olefins. Equations 32 and 34–36, illustrate the kinds of reactions which occur, it being understood that R now represents the heterocyclic group.

Bifunctional, heterocyclic di(magnesium chlorides), R(MgCl)$_2$·nQ, in which R is a divalent radical which includes in its structure an oxygen, sulfur or tertiary nitrogen heterocycle, its bonds to magnesium being through carbon atoms of aromatic or pseudoaromatic rings, react with ketones as in Equation 33, where X is 2.

(C) *Reactions with alpha and beta unsaturated aldehydes and ketones.*—Heterocyclicmagnesium chloride reagents, RMgCL·nQ as defined for Reactions 76–80 react with alpha, beta unsaturated aldehydes and ketones by addition to the carbonyl group as in the reactions described under parts A and B. They may also react by addition in the 1–4 positions as in the general Equation No. 55. These alternative courses are illustrated in the following equations:

(81)   RMgCl·nQ+CH$_2$=CHCHO→RCH$_2$CH$_2$CHO or $$CH_2=CH-CH(OH)R$$

(82)   RMgCl·nQ+CH$_2$=CH—C(O)CH$_3$→
$$RCH_2CH_2C(O)CH_3$$

or $$CH_2=CHCOH(R)CH_3$$

(D) *Reactions with chloral.*—Heterocyclicmagnesium chloride reagents, RMgCl·nQ, as defined for Equations 76–80 react with chloral according to Equation 58.

Heterocyclic polymagnesium chlorides R(MgCl)$_x$·nQ, wherein R is a radical of valence x which includes in its structure an oxygen, sulfur or tertiary nitrogen heterocycle, its bonds to magnesium being through carbon atoms of aromatic or pseudo aromatic rings, react with chloral according to Equation No. 72.

VINYLMAGNESIUM CHLORIDE REAGENTS

In this application, the term "vinyl" radical refers to the vinyl group or to substituted vinyl groups. Thus, a vinyl chloride has the general formula:

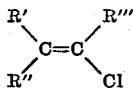

where R', R" and R'" may be the same or different and may be hydrogen or any hydrocarbon group, aliphatic or aromatic; they may also be hydrocarbon groups with functional group substituents provided that the latter are inert to magnesium and to vinylmagnesium chloride; R' may cyclicize with R" or R'" as, for example in the compound:

$$CH_2-CH=C-Cl$$
$$|\qquad\qquad|$$
$$CH_2-CH_2-CH_2$$

furthermore, R'" may also be chlorine, in which case the magnesium may react with one or both chlorines.

When the formula RMgCl·nQ is used in this application to refer to a vinylmagnesium chloride, then R represents the group

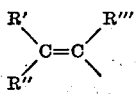

where R', R" and R'" are as defined above.

Similarly, in a vinyl dimagnesium chloride reagent, R(MgCl)$_2$·nQ, R represents the bivalent group

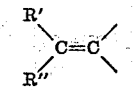

(A) *Reactions with aldehydes.*—Vinylmagnesium chloride reagents, RMgCl·nQ, as defined above, react with aldehydes in accordance with Equations 1, 2, 3, 6, 7, 8 and 58, to form secondary alcohols; formaldehyde, Equation 5, yields primary alcohols.

When the alcohols thus formed contain the grouping

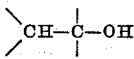

they may be dehydrated to form olefins,

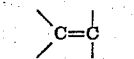

Vinyl dimagnesium chlorides react with aldehydes according to Equations 4 where x is 2.

(B) *Reactions with ketones.*—Vinylmagnesium chloride reagents RMgCl·nQ, as defined above react with ketones to yield tertiary alcohols in accordance with Equations 1a, 2a, 34, 35, 36, 37, 38, 39, 40. If an alcohol thus formed contains a hydrogen atom on the carbon atom alpha to the COH group, it may be dehydrated to form an olefin.

(83)    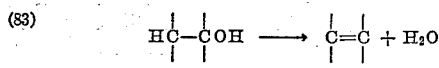

Vinyl di(magnesium chloride) reagents, R(MgCl)$_2$·nQ, as defined above, react with ketones according to Equations 47, 48, 49, 50, 51, 52, 53 and 54 to form tertiary alcohols and, by subsequent dehydration when this is possible, various dehydration products.

(C) *Reactions with α, β, unsaturated aldehydes and ketones.*—Vinyl magnesium chloride reagents, RMgCl·nQ as defined above may react with α, β unsaturated aldehydes and ketones by addition at the carbonyl group as described under A and B. In addition, they may add 1–4 as illustrated by the following equations:

(84)
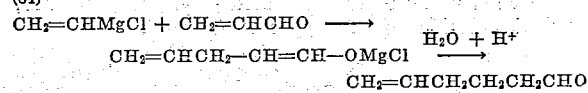

(85)
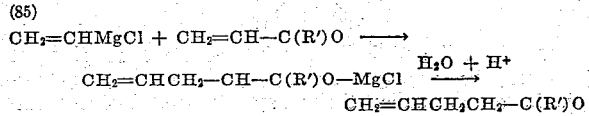

By way of further illustration quinone may react with the vinyl magnesium chloride reagent $CH_2=CHMgCl \cdot nQ$ in the following ways; it is assumed that the hydrolysis step has been carried out:

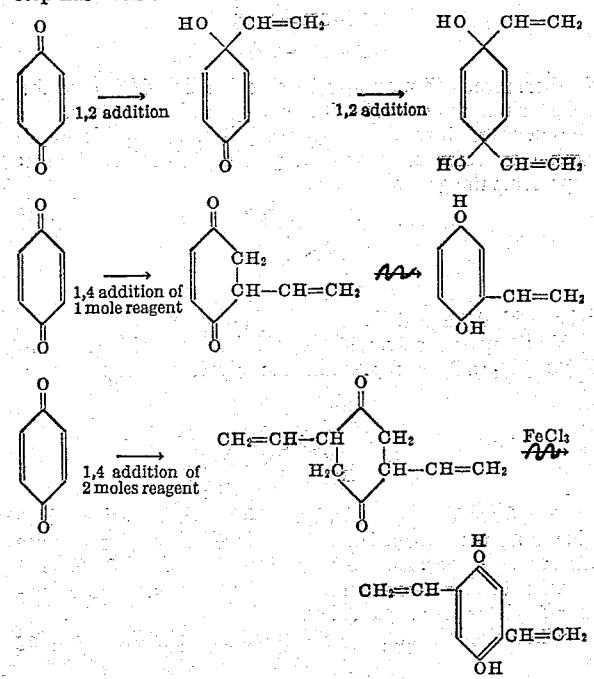

The following examples are illustrative of the present invention, however, it will be understood that the invention is not limited thereto.

*Example 1.—Preparation of allyl alcohol*

One mole vinyl magnesium chloride-tetrahydrofuran complex dissolved in tetrahydrofuran (total volume 442 ml.) was added slowly from a dropping funnel to a mechanically stirred suspension of 1 mole of trioxymethylene in tetrahydrofuran in a 1,000 ml. flask. Air was displaced from the apparatus by nitrogen, a slow flow of this gas being maintained during the reaction. The temperature of the reaction mixture was maintained at about 40° C. by varying the rate of addition of the vinyl magnesium chloride reagent and by occasional use of a cooling water bath. The reagent was added over a 30 minute period, the stirring of the mixture being continued for an additional 2½ hours. Then, dilute sulfuric acid (28 ml. in 100 ml. water) was added slowly. A jelly-like precipitate was formed. After standing for two days the mixture was filtered. The organic layer of the filtrate was fractionally distilled through a short column, a gram of hydroquinone and about 100 ml. of high boiling hydrocarbon having been added. A small amount of allyl alcohol, representing about a 15% yield, distilled over at 97–99° C. Its refractive index was 1.4125.

*Example 2.—Preparation of methyl-vinyl-carbinol*

Using the same apparatus as in Example 1, 1 mole of vinyl magnesium chloride-tetrahydrofuran complex dissolved in tetrahydrofuran was added to 1 mole of acetaldehyde in 100 ml. of tetrahydrofuran. The temperature was kept below about 20° C. during the addition which required 1 hour. The flask was then cooled by an ice water bath and dilute sulfuric acid was added. The solid material which precipitated out was separated by suction filtration. An organic layer was separated from the filtrate and fractionally distilled using a 15" packed column; a little hydroquinone and about 100 ml. of high boiling hydrocarbon were added to the boiling flask before completion of the distillation. Methyl-vinyl-carbinol was recovered as a fraction boiling at 93° C. Its refractive index was 1.4125. The yield of pure product was about 22% of theory. No attempt was made to recover more product by redistillation of the other fractions.

*Example 3.—Preparation of propyl-vinyl-carbinol*

Using the apparatus and procedure of Example 1, vinyl magnesium chloride-tetrahydrofuran complex was allowed to react with butyraldehyde at 20–30° C. After the sulfuric acid hydrolysis the excess acid was neutralized with sodium bicarbonate and the solid precipitate was filtered out. By distillation of the organic layer of the filtrate, about 31% of the theoretical yield of propyl-vinyl-carbinol was recovered as a fraction boiling at 88° C. and having a refractive index of 1.426.

*Example 4.—Preparation of phenyl-vinyl-carbinol*

One mole of vinylmagnesium chloride-tetrahydrofuran complex was caused to react with 1 mole of benzaldehyde in tetrahydrofuran medium using the apparatus and procedure of Example 1. Dilute hydrochloric acid was used for the hydrolysis step. After neutralizing the excess acid with sodium bicarbonate the reaction mixture separated into two liquid layers. From the organic layer, phenyl-vinyl-carbinol was separated by fractional distillation under vacuum. The refractive index was 1.5435 at 16° C. and the yield was 59% of theoretical.

*Example 5.—Preparation of 3-methyl-1-butene-3-ol and isoprene*

By reacting equimolar proportions of vinylmagnesium chloride-tetrahydropyran complex and acetone under essentially the conditions of Example 4, an excellent yield of 3-methyl-1-butene-3-ol was obtained. This product was dehydrated by heating to about 80–90° C. with a small amount of aniline hydrobromide in a flask equipped with a 4" packed column and a variable take-off distillation head. The isoprene was taken off as it formed. The head temperature stayed at 33–34° C. during the process. The over-all yield for the series of reactions was about 50% of theoretical.

*Example 6.—Preparation of 1-vinylcyclohexanol-1*

One mole of cyclohexanone and 1 mole of vinylmagnesium chloride-tetrahydrofuran complex were caused to react under the conditions of Example 4. About 75 grams of crude 1-vinylcyclohexanol-1 (R.I. 1.4775) were recovered.

*Example 7.—Preparation of methyl-vinyl-phenyl-carbinol*

0.56 mole of acetophenone and 0.6 mole of vinylmagnesium chloride complex in tetrahydrofuran were caused to react under the condition of Example 4. 42.4 grams of methyl-vinyl-phenyl-carbinol were recovered.

*Example 8.—Preparation of polymer of methyl-vinyl-styryl-carbinol*

When 1 mole of benzalacetone was caused to react with 1.1 moles of vinylmagnesium chloride complex using the procedure of Example 4, there were recovered, after stripping off solvents, about 140 grams of a brittle resin which was the polymer of methyl-vinyl-styryl carbinol.

*Example 9.—Preparation of polymer of distyryl-vinyl-carbinol*

By reaction of dibenzalacetone with vinylmagnesium chloride complex in tetrahydrofuran there was produced a dark-colored, viscous liquid copolymer of distyryl-vinyl-carbinol.

*Example 10.—Preparation of benzyl alcohol*

One mole of phenylmagnesium chloride-tetrahydrofuran complex (3 moles of tetrahydrofuran) is added over a period of 1 hour to a stirred solution of 1.0 mole trioxymethylene in 100 ml. tetrahydrofuran. Refluxing conditions are maintained during the addition, and stirring and heating continued for an additional hour. The reaction mixture is then cooled, dil. HCl added, and the resulting solid filtered off. From the filtrate (organic layer) is obtained, by distillation, benzyl alcohol, B.P. 93°/10 mm., $n$ 1.5395.

*Example 11.—Preparation of 2-phenyl-2-propanol*

When 1.0 mole of phenylmagnesium chloride-methyltetrahydrofuran complex is allowed to react with 1.0 mole of acetone under the conditions of Example 10, the resulting product is 2-phenyl-2-propanol.

*Example 11A.—Preparation of 2-phenylpropylene*

The 2-phenyl-2-propanol from Example 11 on refluxing with glacial acetic acid and a crystal of iodine is dehydrated to 2-phenyl-propylene.

*Example 12.—Preparation of α-p-chlorophenylethanol*

One mole of p-chlorophenylmagnesium chloride-tetrahydrofuran complex (3 moles tetrahydrofuran) is added dropwise to a stirred solution of 1.0 mole acetaldehyde in 100 ml. tetrahydrofuran. The addition takes approximately 1 hour and is carried out at 70–80°. One hour additional refluxing and stirring is needed to complete the reaction. The mixture is first cooled and then hydrolyzed by the addition of dil. $H_2SO_4$. A solid forms which is filtered off and discarded, and from the filtrate (organic layer) is isolated, the desired product, α-p-chlorophenyl-ethanol.

*Example 12A.—Preparation of p-chlorostyrene*

The α-p-chlorophenylethanol is dehydrated by passing it over $Al_2O_3$ heated to 250° C. It is passed over at a pressure of 10 mm. of mercury (i.e., vacuum), and yields p-chlorostyrene.

*Example 13.—Preparation of 3-p-chlorophenyl-1-butyral*

Equimolar quantities of p-chlorophenylmagnesium chloride in tetrahydrofuran and crotonaldehyde are caused to react according to the procedure of Example 10. Addition of the Grignard is primarily 1,4- and gives as the principal product 3-p-chlorophenyl-1-butyral.

*Example 14.—Preparation of 1-p-chlorophenyl-1-cyclohexanol*

Equimolar quantities of p-chlorophenylmagnesium chloride-tetrahydrofuran complex and cyclohexanone are allowed to react 2 hours at 70–80°. The reaction flask is cooled and the mixture hydrolyzed by dil. $H_2SO_4$, and the excess acid then neutralized with sodium bicarbonate. Removal of solvent and high vacuum distillation gives 1-p-chlorophenyl-1-cyclohexanol.

*Example 15.—Preparation of 3,4-dichlorobenzhydrol*

When 1.0 mole of 3,4-dichlorophenylmagnesium chloride-tetrahydrofuran complex is allowed to react with 1.0 mole benzaldehyde under the conditions of Example 10, the product thus obtained is 3,4-dichlorobenzhydrol.

*Example 16.—Preparation of 1-(3,4-dichlorophenyl)-1-cyclohexanol*

The reaction of 1.0 mole 3,4-dichlorophenylmagnesium chloride-tetrahydrofuran complex with 1.0 mole cyclohexanone in the manner described in Example 14 yields 1-(3,4-dichlorophenyl)-1-cyclohexanol.

*Example 17.—Preparation of 2,4,5-trichlorophenylbenzhydrol*

The conditions of Example 12 are followed, using 2,4,5-trichlorophenylmagnesium chloride and benzaldehyde as reactants and the product isolated from the filtrate is 2,4,5-tri-chlorophenylbenzhydrol.

*Example 18.—Preparation of 2-(2,4,5-trichlorophenyl)-2-propanol*

Equimolar quantities of 2,4,5-trichlorophenylmagnesium chloride-tetrahydrofuran complex and acetone in tetrahydrofuran are allowed to react under essentially the conditions of Example 14, yielding 2-(2,4,5-trichlorophenyl)-2-propanol.

*Example 18A.—Dehydration of 2-(2,4,5-trichlorophenyl)-2-propanol*

2-(2,4,5-trichlorophenyl)-2-propanol, on refluxing in benzene with p-toluenesulfonic acid, leads to 2-(2,4,5-trichlorophenyl) propylene.

*Example 19.—Preparation of 2-(2,3,4,5,6-pentachlorophenyl)-1-butanol*

One mole of 2,3,4,5,6-pentachlorophenylmagnesium chloride tetrahydrofuran complex (5 moles tetrahydrofuran) is added dropwise to a stirred solution of 1.0 mole butyraldehyde in 100 ml. tetrahydrofuran under refluxing conditions. After a one hour additional reaction period, the mixture is cooled and hydrolyzed with dil. HCl. The filtrate obtained after the unwanted solid is removed by filtration is stripped of solvent and the residue, on purification, yields 1-(2,3,4,5,6-pentachlorophenyl)-1-butanol.

*Example 20.—Preparation of 1-(2,3,4,5,6-pentachlorophenyl)-1-cyclohexanol*

Equimolar quantities of 2,3,4,5,6-pentachlorophenylmagnesium chloride and cyclohexanone are allowed to react under the conditions of Example 14 (5 moles of tetrahydrofuran necessary for complex formation), and the product which results is 1-(2,3,4,5,6-pentachlorophenyl)-1-cyclohexanol.

*Example 21.—Preparation of 2,3,4,5,6-pentachlorobenzhydrol*

When the conditions of Example 10 are followed, using 1.0 mole 2,3,4,5,6-pentachlorophenylmagnesium chloride-tetrahydrofuran complex and 1.0 mole benzaldehyde, a residue is obtained from which 2,3,4,5,6-pentachlorobenzhydrol is isolated by crystallization.

*Example 22.—Preparation of α-phenyl- α-(2,3,4,5,6-pentachlorophenyl) ethanol*

The reaction of 1.0 mole 2,3,4,5,6-pentachlorophenylmagnesium chloride in 5.0 moles tetrahydrofuran with 1.0 mole acetophenone as described in Example 14 gives as the principal product α-phenyl-α-(2,3,4,5,6-pentachlorophenyl) ethanol.

*Example 23.—Preparation of α-[2(4)-chloro-4(2)-tolyl]ethanol*

One mole 2(4)-chloro-4(2)-tolylmagnesium chloride-tetrahydrofuran complex is caused to react with 1.0 mole acetaldehyde using the conditions of Example 12. From the filtrate a solid is isolated which is the desired product, α-[2(4)-chloro-4(2)-tolyl] ethanol.

*Example 24*

When equimolar quantities of 2(4)-chloro-4(2)-tolylmagnesium chloride-tetrahydrofuran complex and benzalacetone are allowed to react according to the procedure of Example 14, a mixture of products results. This is attributed to a combination of 1,2- and 1,4- addition and the mixture probably contains both 4-phenyl-4-[2(4)- chloro-4(2)-tolyl]-2-butanone and α-styryl-α-[2(4)-chloro-4(2)-tolyl] ethanol.

*Example 25.—Preparation of 1-o-tolyl-1-butanol*

The procedure of Example 10 is followed with 1.0 mole o-tolyl-magnesium chloride-tetrahydrofuran complex and 1.0 mole butyraldehyde as reactants to give 1-o-tolyl-1-butanol.

*Example 26.—Preparation of 1-m-tolyl-1-butanol*

Equimolar quantities of m-tolylmagnesium chloride-tetrahydrofuran complex and butyraldehyde react under the conditions of Example 10 to yield 1-m-tolyl-1-butanol.

*Example 27.—Preparation of 1-p-tolyl-1-butanol*

One mole p-tolylmagnesium chloride-tetrahydrofuran complex and 1.0 mole butyraldehyde are allowed to react under the conditions of Example 10. From the filtrate is obtained 1-p-tolyl-1-butanol.

*Example 27A.—Preparation of 1-p-tolyl-1-butene*

The 1-p-tolyl-1-butanol from Example 27 on refluxing with glacial acetic acid and a crystal of iodine is dehydrated to 1-p-tolyl-1-butene.

*Example 28.—Preparation of 1-phenyl-1-o-tolylethanol*

By allowing 1.0 mole o-tolylmagnesium chloridetetrahydrofuran complex and 1.0 mole acetophenone to react according to the procedure for Example 14 there is isolated 1-phenyl-1-o-tolylethanol.

*Example 29.—Preparation of 1-phenyl-1-m-tolylethanol*

Following the conditions of Example 14 with m-tolylmagnesium chloride-tetrahydrofuran complex and acetophenone as reactants, there is obtained 1-phenyl-1-m-tolylethanol.

*Example 29A.—Preparation of α-tolylstyrene*

Dehydration of 1-phenyl-1-m-tolylethanol according to Example 18A gives α-tolylstyrene.

*Example 30.—Preparation of 1-phenyl-1-p-tolylethanol*

The reaction of equimolar quantities of p-tolylmagnesium chloride and acetophenone under the conditions of Example 14 yields 1-phenyl-1-p-tolylethanol.

*Example 31.—Preparation of α(2-ethoxyphenyl)-benzyl alcohol*

2 - ethoxyphenylmagnesium chloride - tetrahydrofuran complex and benzaldehyde are allowed to react according to the procedure of Example 12 to give α-(2-ethoxyphenyl)-benzyl alcohol.

*Example 32.—Preparation of 2-thenyl alcohol*

One mole 2-thenylmagnesium chloride-tetrahydrofuran complex is allowed to react with 1.0 mole trioxymethylene by the process described in Example 12. Removal of the solvent and distillation of the residue gives 2-thenyl alcohol, B.P. 207°.

*Example 33.—Preparation of 1-(α-thienyl)-1-cyclohexanol*

The conditions of Example 14 are followed with 2-thienyl magnesium chloride-tetrahydrofuran complex and cyclohexanone as reactants and the product obtained is 1-(α-thienyl)-1-cyclohexanol.

*Example 34.—Preparation of α-pyridylcarbinol*

When equimolar quantities of α-pyridylmagnesium chloride-tetrahydrofuran complex and trioxymethylene are brought together according to the procedure of Example 10, the product is α-pyridylcarbinol.

*Example 35.—Preparation of 1-α-pyridyl-1-cyclohexanol*

Pyridylmagnesium chloride-tetrahydrofuran complex and cyclohexanone are allowed to react in the manner described in Example 14. This yields 1-α-pyridyl-1-cyclohexanol.

*Example 36.—Preparation of 1-(2-quinolyl)ethanol*

Following the conditions of Example 14 with 2-quinolylmagnesium chloride-tetrahydrofuran complex and acetaldehyde as reactants, there is obtained 1-(2-quinolyl) ethanol.

*Example 36A.—Preparation of 2-vinylquinoline*

Dehydration of 1-(2-quinolyl) ethanol by refluxing it in benzene with a small amount of p-toluenesulfonic acid gives 2-vinylquinoline.

*Example 37.—Preparation of 1-(6-quinolyl)ethanol*

The reaction of equimolar quantities of 6-quinolylmagnesium chloride-tetrahydrofuran complex with acetaldehyde according to Example 14 gives 1-(2-quinolyl) ethanol.

*Example 38.—Preparation of 1-(8-quinolyl)ethanol*

One mole of 8-quinolylmagnesium chloride-tetrahydrofuran complex and 1.0 mole of acetaldehyde react under the conditions of Example 14, and from the filtrate there is isolated 1-(8-quinolyl)ethanol.

*Example 39.—Preparation of 1-phenyl-1-(2-quinolyl) ethanol*

2-quinolylmagnesium chloride-tetrahydrofuran complex and acetophenone are allowed to react by the process outlined in Example 14 and the resulting product is 1-phenyl-1-(2-quinolyl)ethanol.

*Example 40.—Preparation of 1-phenyl-1-(6-quinolyl ethanol*

When equimolar quantities of 6-quinolylmagnesium chloride-tetrahydrofuran complex and acetophenone are caused to react under the conditions of Example 14, there is obtained 1-phenyl-1-(6-quinolyl) ethanol.

*Example 41.—Preparation of 1-phenyl-1-(8-quinolyl) ethanol*

Following the conditions of Example 14 with 8-quinolyl-magnesium chloride-tetrahydrofuran complex and acetophenone as reactants, there is isolated from the filtrate, 1-phenyl-1-(8-quinolyl) ethanol.

*Example 42.—Preparation of 1-(2-benzoxazolyl)-1-butanol*

The reaction of equimolar quantities of 2-benzoxazolyl-magnesium chloride-tetrahydrofuran complex and butyraldehyde under the conditions of Example 14 yields 1-(2-benzoxazolyl)-1-butanol.

*Example 43.—Preparation of 1-(2-benzothiazolyl)-1-butanol*

2 - benzothiazolylmagnesium chloride-tetrahydrofuran complex and butyraldehyde are allowed to react according to the procedure of Example 14 to give 1-(2-benzothiazolyl)-1-butanol.

*Example 44*

When equimolar quantities of 2-benzoxazolylmagnesium chloride-tetrahydrofuran complex and benzalacetone are caused to react under the conditions of Example 14, both 1,2- and 1,4- addition occurs giving a mixture of products. The residue probably contains both α-styryl-α - (2-benzoxazolyl) ethanol and 4-phenyl-4-(2-benzoxazolyl)2-butanone.

*Example 45*

Two products are also formed when 1.0 mole benzothiazolyl-magnesium chloride-tetrahydrofuran complex and 1.0 mole benzalacetone react according to Example 14. These are α-styryl-α-(2-benzothiazolyl) ethanol and 4-phenyl-4-(2-benzothiazolyl)-2-butanone.

Example 46.—Preparation of 1-(2-methyl-5-benzothiazolyl)-1-butanol

The conditions of Example 14 are followed with 2-methyl-benzothiazol-5-yl-magnesium chloride-tetrahydrofuran complex and butyraldehyde as reactants. The resulting product is 1-(2-methyl-5-benzothiazolyl)-1-butanol.

Example 46A.—Preparation of 1-(2-methyl-5-benzothiazolyl)-1-butene

The 1-(2-methyl-5-benzothiazolyl)-1-butanol from Example 46 is dehydrated by refluxing with glacial acetic acid and a crystal of iodine to 1-(2-methyl-5-benzothiazolyl)-1-butene.

Example 47

When equimolar quantities of 2-methyl-benzothiazol-5-yl-magnesium chloride-tetrahydrofuran complex and benzalacetone are allowed to react under the conditions of Example 14, a mixture of two products is obtained. These result from both 1,2- and 1,4- addition of the Grignard reagent and are α-styryl-α-(2-methyl-5-benzothiazolyl) ethanol and 4-phenyl-4-(2-methyl-5-benzothiazolyl)-2-butanone.

Example 48.—Preparation of α-(6-chloro-2-methoxy-4-acridyl) benzyl alcohol

The reaction of 1.0 mole 6-chloro-2-methoxy-acrid-4-yl-magnesium chloride and 1.0 mole benzaldehyde in tetrahydrofuran in the manner described in Example 14 leads to α-(6-chloro-2-methoxy-4-acridyl) benzyl alcohol.

Example 49.—Preparation of 2-(6-chloro-2-methoxy-4-acridyl)-2-propanol

Following the procedure of Example 14 and using 6-chloro-2-methoxy-acrid-4-yl-magnesium chloride-tetrahydrofuran complex and acetone as reactants, there is obtained 2-(6-chloro-2-methoxy-4-acridyl)-2-propanol.

Example 50.—Preparation of 4(6)-chloro-6(4)-pyrimidyl-phenyl carbinol

When 1.0 mole 4(6)-chloro-6(4)-pyrimidylmagnesium chloride-tetrahydrofuran complex is allowed to react with 1.0 mole of benzaldehyde as described in Example 14, the product which forms is 4(6)-chloro-6(4)-pyrimidyl-phenylcarbinol.

Example 51.—Preparation of 2-[4(6)-chloro-6(4)-pyrimidyl]-2-propanol

The conditions of Example 14 are followed and applied to 4(6)-chloro-6(4) pyrimidylmagnesium chloride and acetone. From the filtrate there is obtained on purification, 2-[4(6)-chloro-6(4)-pyrimidyl]-2-propanol.

Example 51A.—Preparation of 4(6)-chloro-6(4)-[2-propenyl]-pyrimidine

The 2-[4(6)-chloro-6(4)-pyrimidyl]-2-propanol from Example 51 is dehydrated by refluxing in benzene with a small amount of p-toluenesulfonic acid to yield 4(6)-chloro-6(4)-[2-propenyl]-pyrimidine.

Example 52.—Preparation of α-furylphenylcarbinol

Equimolar quantities of α-furylmagnesium chloride-tetrahydrofuran complex and benzaldehyde are caused to react according to the procedure of Example 10 and yield α-furylphenylcarbinol.

Example 53.—Preparation of 1-α-furyl-1-cyclohexanol

By allowing 1.0 mole α-furylmagnesium chloride-tetrahydrofuran complex and 1.0 mole cyclohexanone to react in the manner described in Example 14, there is isolated 1-α-furyl-1-cyclohexanol.

Example 53A.—Preparation of 1-α-furyl-1-cyclohexene

Dehydration of 1-α-furyl-1-cyclohexanol by boiling in glacial acetic acid with a crystal of iodine yields 1-α-furyl-1-cyclohexene.

Example 54.—Preparation of 2,5-bis(1-hydroxyethyl) thiophene

The reaction between equimolar quantities of 2,5-thiophene dimagnesium chloride-tetrahydrofuran complex and acetaldehyde according to Example 10, leads to 2,5-bis(1-hydroxyethyl) thiophene.

Example 54A.—Preparation of 2,5-divinylthiophene 2,5-bis(1-hydroxyethyl) thiophene is dehydrated by refluxing in benzene with a trace of p-toluenesulfonic acid. The product is 2,5-divinylthiophene.

Example 55.—Preparation of 2,5-bis(2-hydroxy-2-propyl) thiophene

Following the directions of Example 10 and using 2,5-thiophene dimagnesium chloride-tetrahydrofuran complex and acetone, there results 2,5-bis(2-hydroxy-2-propyl) thiophene.

Example 55A.—Preparation of 2,5-bis(2-propenyl) thiophene

The compound of Example 55 is dehydrated by the procedure of Example 11A to give 2,5-bis(2-propenyl) thiophene.

Example 56.—Preparation of 3-(2-chloro-5-thienyl)-1-butyral

When equimolar quantities of 2-chloro-5-thienyl-magnesium chloride-tetrahydrofuran complex and crotonaldehyde are caused to react under the conditions of Example 12, the principal product is 3-(2-chloro-5-thienyl)-1-butyral.

Example 57.—Preparation of α-phenyl-α-(2-chloro-5-thienyl) ethanol

The reaction of 1.0 mole 2-chloro-5-thienylmagnesium chloride and acetophenone in tetrahydrofuran according to the process of Example 14 leads to α-phenyl-α-(2-chloro-5-thienyl) ethanol.

Example 57A.—Preparation of 2-chloro-5-(α-phenylvinyl) thiophene

Dehydration of α-phenyl-α-(2-chloro-5-thienyl) ethanol by the method of Example 11A gives 2-chloro-5-(α-phenylvinyl) thiophene.

Example 58.—Preparation of 3-chloro-2-hepten-4-ol

The conditions of Example 12 are followed and applied to 1-chloro-1-propenylmagnesium chloride-tetrahydrofuran complex and butyraldehyde. From the filtrate there is obtained on purification, 3-chloro-2-hepten-4-ol.

Example 58A.—Preparation of 3-chloro-2,4-heptadiene 3-chloro-2-hepten-4-ol is dehydrated by refluxing it in glacial acetic acid with a crystal of iodine and gives 3-chloro-2,4-heptadiene.

Example 59.—Preparation of 1-phenyl-2-chlorocrotonyl alcohol

Equimolar quantities of 1-chloro-1-propenylmagnesium chloride and benzaldehyde in tetrahydrofuran are allowed to react according to the method given in Example 10. This gives as the product, 1-phenyl-2-chlorocrotonyl alcohol.

Example 60.—Preparation of 1-(1-chloro-1-propen-1-yl)-1-cyclohexanol

When 1.0 mole of 1-chloro-1-propenylmagnesium chloride-tetrahydrofuran complex is caused to react with 1.0 mole cyclohexanone under the conditions of Example 14, there results 1-(1-chloro-1-propen-1-yl)-1-cyclohexanol.

*Example 60A.—Preparation of 1-(1-chloro-1-propen-1-yl)-1-cyclohexene*

Dehydration of 1-(1-chloro-1-propen-1-yl)-1-cyclohexanol according to Example 36A yields 1-(1-chloro-1-propen-1-yl)-1-cyclohexene.

*Example 61.—Preparation of 3-chloro-4-phenyl-2-penten-4-ol*

One mole of 1-chloro-1-propenylmagnesium chloride-tetrahydrofuran complex and 1.0 mole of acetophenone are allowed to react under the conditions of Example 14. From the filtrate there is obtained 3-chloro-4-phenyl-2-penten-4-ol.

*Example 62*

When p-dimethylaminophenylmagnesium chloride is allowed to react with acetaldehyde under the conditions of Example 12, with the added step of neutralizing the excess $H_2SO_4$ with $NaHCO_3$, α-p-dimethylaminophenylethanol results.

*Example 63*

Pentafluorophenylmagnesium chloride and acetaldehyde under the conditions of Example 12 yields α-pentafluorophenylethanol.

*Example 64*

Para-fluorophenylmagnesium chloride used in Example 63 yields α-fluorophenylethanol

*Example 65*

Ortho-trifluoromethylphenylmagnesium chloride in Example 63 yields α-o-trifluoromethylphenylethanol.

*Example 66*

Para-trimethylsilylphenylmagnesium chloride used in Example 63 yields α-p-trimethylsilylphenylethanol, which may be dehydrated by refluxing in benzene (p-toluenesulfonic acid catalyst) to p-trimethylsilylstyrene.

*Example 67*

Para-tributylstannylphenylmagnesium chloride used in Examples 63 yields α-p-tri-n-butylstannylphenylethanol.

*Example 68.—Terpene alcohol*

One mole of 6-methyl-5-hepten-2-one and one mole of vinylmagnesium chloride-tetrahydrofuran complex by the process of Example 4 yields 3, 7-dimethyl-1, 6-octadienol-3 (B.P. $_{10}$mm. 80–83° C., a terpene alcohol.

*Example 69.—5-(2,2,6-trimethyl-6-cyclohexen-1-yl) 3-methyl-1, 4-pentadiene-3-ol*

One mole of β ionone and one mole of vinylmagnesium chloride complex by the process of Example 4 yields 5 - (2,2,6 - trimethyl - 6 - cyclohexen-1-yl)-3-methyl-1, 4-pentadien-3-ol.

Throughout the application it is specified that the reactive compound is $RMgCl \cdot nQ$. This is so in the equations illustrative of the process and of the materials used in the examples. It is necessary that the RMgCl compound be formed in the presence of compound Q. However, the process of the present invention is not dependent upon RMgCl being present in the form of the Q complex ($RMgCl \cdot nQ$). The illustrative equations herein may also be written with RMgCl in place of $RMgCl \cdot nQ$ and could be read with RMgCl as an alternative reactant to $RMgCl \cdot nQ$.

The processes of this invention have utility in several ways, namely:

(1) They provide economical means for producing chemicals which are already articles of commerce, such as allyl alcohol, parachlorostyrene, benzhydrol, etc.

(2) They provide means for introducing unusual substituents into well known alcohols. These substituents alter profoundly the physical and, in some cases, the chemical properties of the alcohols, greatly increasing their field of usefulness. Many of the compounds so formed are entirely new, while others, although known, have never reached commercial acceptance because the previous methods of manufacture were too expensive.

(3) Their versatility makes it possible to "tailor-make" chemicals for specific applications, especially when aryl, heterocyclic or vinyl groups are needed.

(4) It is now possible to make, by these processes, new olefins containing aryl, heterocyclic and vinyl substituents. Such olefins may be polymerized or copolymerized to produce resins of special properties.

While the invention has been described with particular reference to specific embodiments, it is to be understood that it is not limited thereto but is to be construed broadly and restricted solely by the scope of the appended claims.

What is claimed is:

1. A process comprising reacting a compound selected from the class consisting of acetaldehyde, butyraldehyde, benzaldehyde, trioxymethylene, acetone, cyclohexanone, acetophenone, benzalacetone, dibenzalacetone, crotonaldehyde, and β-ionone with an organomagnesium chloride in the presence of compound Q; said organomagnesium chloride being prepared by reacting an organic chloride of the formula RCl, wherein R is selected from the class consisting of aryl, vinyl and aromatic-heterocyclic radicals, with magnesium in compound Q; wherein said compound Q is selected from the class consisting of tetrahydrofuran, tetrahydropyran, 2-ethoxytetrahydropyran, dihydropyran, tetrahydrofurfuryl ethyl ether, and 2-methyl tetrahydrofuran; and wherein said aromatic-heterocyclic radical is selected from the class consisting of α-thienyl, α-pyridyl, 2-quinolyl, 6-quinolyl, 8-quinolyl, 2-benzoxazolyl, 2-benzothiazolyl, 2-methylbenzothiazol-5-yl, 6-chloro-2-methoxy-acrid-4-yl, 4-chloro-6-pyrimidyl, α-furyl, 2,5-thiophendiyl and 2-chloro-5-thienyl.

2. The process according to claim 1 in which Q is tetrahydrofuran.

3. The process according to claim 1 in which R is the vinyl radical.

4. The process according to claim 1 in which R is an aryl radical.

5. The process according to claim 1 in which R is the p-vinylphenyl radical.

6. The process according to claim 1 in which R is the pyridyl radical.

7. The process according to claim 4 in which the aryl radical is the phenyl radical.

References Cited in the file of this patent

Fieser et al.: Org. Chem., Reinhold Publ. Co. (1950), p. 135.

Kharasch: Grignard Reactions of Non-Metallic Substances, 1954, pp. 138–529.

Kharasch: Grignard Reactions of Non-Metallic Substances, 1954, pp. 50 and 51.

Helv. Chim. Acta, vol. 26, 1943, pp. 2251–2252.